United States Patent
Salamh et al.

[11] Patent Number: 6,128,855
[45] Date of Patent: Oct. 10, 2000

[54] CEMETERY VASE

[75] Inventors: Michael Salamh, Pequea; Timothy M. Winger, Lancaster, both of Pa.

[73] Assignee: Novelty Manufacturing Co., Lancaster, Pa.

[21] Appl. No.: 09/248,724

[22] Filed: Feb. 11, 1999

[51] Int. Cl.[7] .................................................... A01G 5/00
[52] U.S. Cl. .................... 47/41.01; 47/41.1; 47/41.14
[58] Field of Search ................. 47/18 R, 39, 40, 47/41 R, 41.01, 41.11, 41.12, 41.13, 66, 68, 86; 119/786; 248/231.4, 311.2; 411/439

[56] References Cited

U.S. PATENT DOCUMENTS

| | | | |
|---|---|---|---|
| D. 248,744 | 8/1978 | Murray | D11/143 |
| D. 300,521 | 4/1989 | Toltzman | D11/155 |
| D. 320,493 | 10/1991 | Fewell | D99/8 |
| 1,448,808 | 3/1923 | McGowan | 47/41.01 |
| 1,879,220 | 9/1932 | Harmony | 47/41.01 |
| 2,241,463 | 5/1941 | Keller | 47/41.01 |
| 2,994,985 | 8/1961 | Jackson, Jr. | 47/41.11 |
| 3,003,284 | 10/1961 | Smithers | 47/41.12 |
| 4,217,729 | 8/1980 | Cooper | 47/41 G |
| 4,927,118 | 5/1990 | Pierorazio | 248/545 |
| 5,647,108 | 7/1997 | Crook | 27/1 |

*Primary Examiner*—Michael J. Carone
*Assistant Examiner*—Francis T. Palo
*Attorney, Agent, or Firm*—Martin Fruitman

[57] ABSTRACT

The apparatus is a cemetery vase constructed as a container with a spike protruding from a hole in the bottom to permit the spike to be forced into the ground for support. The distinction from similar devices is that the container is plastic, the spike has circumferential serrations to mechanically lock it in place, and that no adhesive is required for assembly. The container is formed with surface ribs adjacent to the hole to strengthen the structure to prevent damage by insertion of the spike, and the container also has internal fins to grip a foam plug which can hold the flowers.

10 Claims, 1 Drawing Sheet

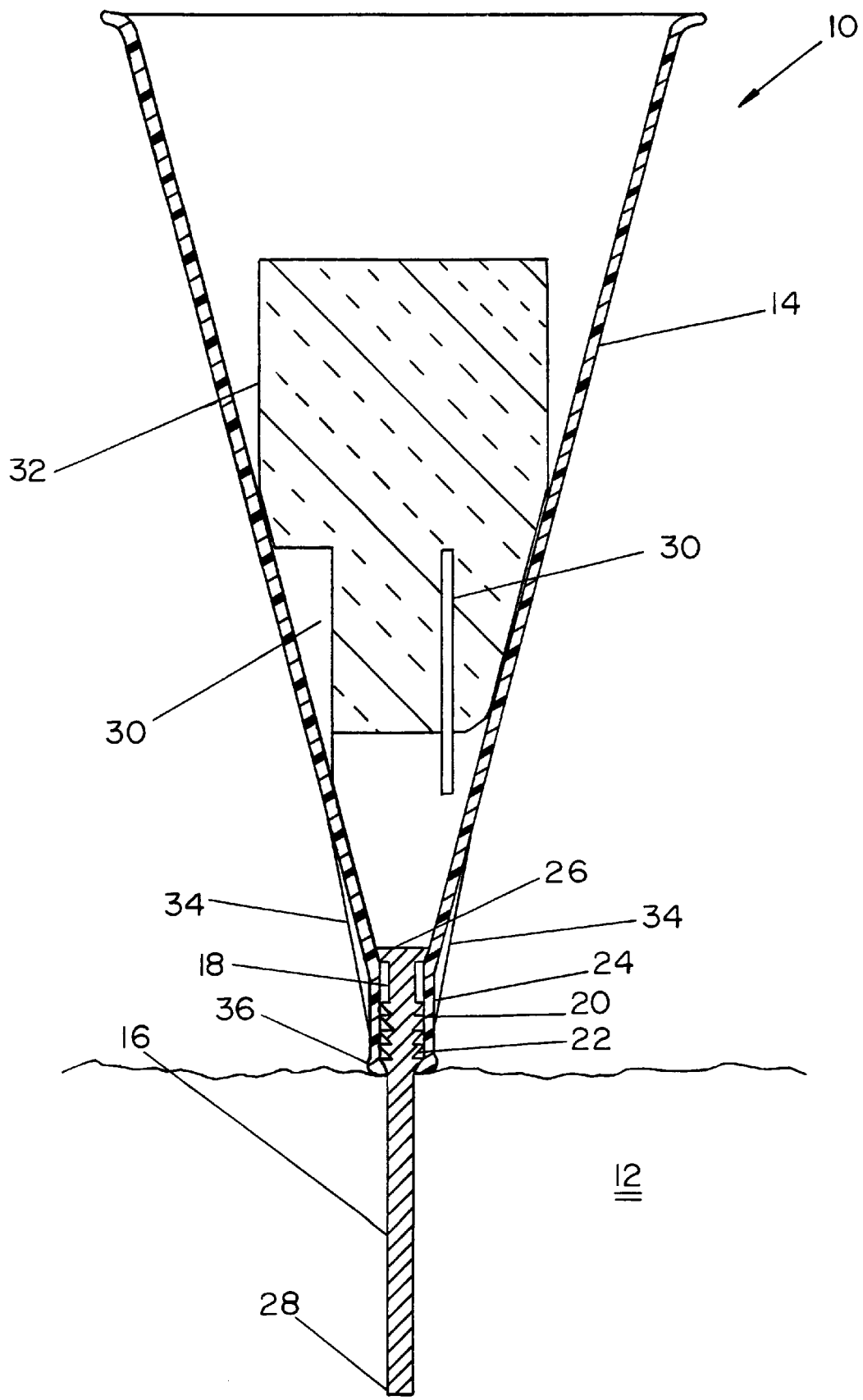

CEMETERY VASE

BACKGROUND OF THE INVENTION

This invention deals generally with receptacles, and more specifically with a cemetery vase, a container to hold flowers at a grave site.

The cemetery vases used to hold flowers at a grave site have one primary requirement. They must be inexpensive. Since such cemetery vases are left unattended for long periods of time, there is no assurance that the vases will be not be taken from their location. In fact, The requirement of maintaining the grave site by mowing the grass means it is almost certain that a new cemetery vase is required for every bunch of flowers brought to a cemetery. Therefore, florists furnish cemetery vases to customers, and whether it is included in the cost of the flowers or sold separately, there is a strong incentive to minimize the cost.

Cemetery vases have therefore typically been made of only two parts, a metal cone with a hole in the apex, and a metal spike bonded into and protruding through the hole. This permits the spike to be pushed into the ground so that the interior of the cone can hold the flowers. However, even this simple structure has problems. Clearly, the ability to push the spike into the ground depends on the bond between the spike and the cone, and such bonds, being dependent on the adhesion, have only limited strength. Furthermore, the only practical method of making a metal cone is to shape sheet metal into the required shape, and that is a relatively complex process.

It would be a considerable structural advantage to have a cemetery vase with a mechanical connection between the spike and the container, and it would be a great economic advantage to be able to make the container of a plastic which could be formed into shape with a high speed molding process. In such a system both the cost of material and the manufacturing time could be greatly reduced.

SUMMARY OF THE INVENTION

The present invention is a cemetery vase for which the container can be injection molded of an inexpensive plastic material. This reduces the cost of both the material and labor for the container, but there are other distinct benefits of the present invention. Since plastic is inherently deformable, it is possible to use a simple mechanical connection between the spike and the container. Thus, the spike is formed with a series of circumferential serrations in the cylindrical surface below the head of the spike. These serrations are not mere grooves, but actually have cross sections which resemble saw blades, and they protrude above the portion of the surface of the spike which is not serrated. Therefore, with the hole in the container dimensioned so that the smooth surface of the spike slides through with little or no force, when the inside surface of the hole engages the serrations the plastic rides up the slopes of the serrations and the peaks of the serrations prevent the spike from being removed. The serrations thus actually engage the surface of the hole and lock the spike onto the container without the need for adhesive. The entire assembly process therefore involves merely pushing the spike into the hole in the container.

Another advantage of the present invention is the ability, with a moldable plastic container, to form the container into shapes other than the conventional simple cone. Once a mold is constructed, the cost of making a bowl, cylindrical, or even a rectangular box shaped container is virtually the same as that of the traditional cone.

Furthermore, while painting a metal cone requires an involved process and the handling of the individual finished pieces, coloring a plastic container only involves tinting the original raw batch of plastic.

Finally, when using a molded container, it is possible to add features which would be prohibitively expensive with sheet metal. For example, sometimes cemetery vases are used in a manner which does not fill the vase up to the point where the flowers are self supporting. The solitary red rose would be a good example. It is also necessary to prevent flowers from being dislodged by wind. Therefore, it is typical to use a piece of plastic foam which is jammed into the vase and to then insert the individual flower stems into the foam plug. However, such a foam plug is held within the prior art vase by only the incidental friction between the foam and the container interior surface.

The present invention includes foam locking fins formed into the interior surfaces of the container. These fins pierce the surfaces of the foam plug and thereby retain the foam within the container and also prevent the foam from tilting from the torque applied to it by wind or large flower stems.

The present invention thereby furnishes an inexpensive and very versatile cemetery vase which improves upon the prior art devices.

BRIEF DESCRIPTION OF THE DRAWING

The FIGURE is a cross section side view of the preferred embodiment of the invention.

DETAILED DESCRIPTION OF THE INVENTION

The FIGURE is a cross section side view of the preferred embodiment of cemetery vase 10 of the invention shown as it would be inserted into the ground 12 at a grave site. The two essential parts of cemetery vase 10 are container 14 and spike 16.

Container 14 is depicted in the form of a cone because that is the typical shape used in the prior art, but container 14 can be formed in virtually any shape. A bowl and a straight sided cylinder with a closed bottom are convenient and easily manufactured shapes, and are, in fact, typical shapes used for flower containers, although they have not been used for cemetery vases, apparently because of the higher cost of manufacture. Such other shapes are anticipated by the present invention, because, along with the cone container depicted, they can all be easily and inexpensively molded from plastic.

Plastic is a desirable material for container 14 because it is inexpensive and permits spike 16 to be mechanically attached to container 14 after container 14 is manufactured. However, many materials could be used. For instance, although clearly not practical for outdoor use and expensive to manufacture, wooden containers would also be satisfactory, and even a properly constructed metal container would work.

Slight deformation of the material of container 14 is required because container 14 is constructed with hole 18 located near its bottom, and spike 16 is inserted into hole 18 and engages hole 18 with serrations 20. As spike 16 is pushed into hole 18, serrations 20 can be forced into the hole because of sloped surface 22, but the peaks of serrations 20 prevent spike 16 from being pushed back out of hole 18 as cemetery vase 10 is pushed into the ground 12. It should be appreciated that, for safety in shipping and handling cemetery vase 10, end 28 of spike 16 is blunt and not formed into a point. A point is not needed because blunt end 28 can still easily be forced into the ground 12 as the top of container 14 is pushed down.

When container 14 is constructed by molding, several other beneficial features can easily be added at virtually no cost. For instance, for a cone shaped container, sections of differing slope can be designed in. Thus, section 24 which is nearly a vertical cylinder is part of the preferred embodiment shown. Such a section acts as a stop for the insertion of spike 16, as head 26 of spike 16 contacts the top of hole 18.

Another easily added feature is one or more foam plug engaging fins 30 which are attached to the inside surfaces of container 14. Foam stem retaining plug 32 is typically placed within a cemetery vase to hold the stems of flowers to prevent them from being dislodged by wind. In the preferred embodiment, three such fins 30 are molded into the container at equal distances from each other. When foam plug 32 is then inserted into container 14, foam plug 32 is pierced by fins 30 and stably retained within container 14.

Certain construction features can also be added to container 14 which strengthen it or permit the use of thinner material, further reducing the cost. Reinforcing ribs 34 are one such feature. They can be added in areas of increased stress such as the region adjacent to serrations 20 and head 26 of spike 16.

Another strengthening feature is thick section 36 located at the bottom of hole 18. Thick section 36 prevents the stress of the engagement of serrations 20 from damaging the bottom of container 14.

The present invention thus offers a new simple and inexpensive structure for a cemetery vase. However, the invention is not restricted to use as a cemetery vase. It can, for instance, be used as an outdoor candle holder.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, more than one spike 16 can be installed in separate holes 18 in container 14, and, in some situations, spike 16 can function satisfactorily with only one serration. Furthermore, serrated spike 16 could actually be used with a prior art sheet metal cone container by properly matching the dimensions of hole 18 and spike 16.

What is claimed as new and for which Letters Patent of the United States are desired to be secured is:

1. A vase for insertion into and support by the ground comprising:

a molded one piece container with an internal volume, a bottom, and at least one through hole located in the container bottom; and at least one spike inserted into at least one hole in the container bottom and dimensioned to extend beyond the hole to the outside of the container, the spike including at least one serration on its surface with the serration engaging the hole in the container when the spike is inserted into the hole so that the serration prevents the spike from moving toward the internal volume of the container.

2. The vase of claim 1 wherein the spike is formed with an integrated head and the head is located within the container internal volume.

3. The vase of claim 1 wherein the spike is formed with an integrated head located within the container internal volume and the head rests against the bottom of the container.

4. The vase of claim 1 wherein the serration is formed with a saw tooth cross section with a sloped surface which is forced into the hole and a peak that engages the surface of the hole and prevents the spike from being removed.

5. The vase of claim 1 wherein the container is constructed of plastic.

6. The vase of claim 1 further including at least one internal structure to engage a stem retaining plug.

7. The vase of claim 1 further including at least one internal fin attached to an inside surface of the container to pierce a stem retaining plug.

8. The vase of claim 1 wherein the container is shaped as a cone with the hole located at the apex of the cone.

9. The vase of claim 1 wherein the container is shaped as a cone with a cylindrical extension at the apex of the cone through which the hole penetrates.

10. The vase of claim 1 further including a smaller diameter portion of the hole against which a serration rests when the spike is in place within the hole.

* * * * *